United States Patent
Neuhaus

(10) Patent No.: US 8,514,840 B2
(45) Date of Patent: Aug. 20, 2013

(54) CALL DISTRIBUTION IN A DIRECT-COMMUNICATION NETWORK

(75) Inventor: Ralf Neuhaus, Lünen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1822 days.

(21) Appl. No.: 11/791,096

(22) PCT Filed: Sep. 20, 2005

(86) PCT No.: PCT/EP2005/054703
§ 371 (c)(1),
(2), (4) Date: May 17, 2007

(87) PCT Pub. No.: WO2006/053798
PCT Pub. Date: May 26, 2006

(65) Prior Publication Data
US 2008/0008305 A1    Jan. 10, 2008

(30) Foreign Application Priority Data
Nov. 17, 2004 (DE) .......... 10 2004 055 494

(51) Int. Cl.
*H04L 12/66* (2006.01)

(52) U.S. Cl.
USPC ........................................ 370/352

(58) Field of Classification Search
USPC ............ 379/90.01, 265, 266, 212.01, 211.02, 379/267, 268, 269, 211, 209.01, 210.01, 379/218.02; 709/206; 370/352, 353, 354, 370/355, 356, 357; 455/417, 456, 459, 461
See application file for complete search history.

(56) References Cited

U.S. PATENT DOCUMENTS

| | | | |
|---|---|---|---|
| 5,329,578 A * | 7/1994 | Brennan et al. | 379/211.03 |
| 5,530,744 A | 6/1996 | Charalambous et al. | |
| 5,825,869 A * | 10/1998 | Brooks et al. | 379/265.12 |
| 5,987,118 A * | 11/1999 | Dickerman et al. | 379/265.01 |
| 6,314,177 B1 * | 11/2001 | Davis et al. | 379/265.12 |
| 6,697,858 B1 * | 2/2004 | Ezerzer et al. | 709/224 |

(Continued)

FOREIGN PATENT DOCUMENTS

CN    1202284 A    12/1998
DE    100 13 185 A1    9/2001

(Continued)

OTHER PUBLICATIONS

Singh K et al: "Peer-to-Peer Internet Telephony using SIP", X, Oct. 31, 2004, pp. 1-19, XP002336408,1 Introduction, 2.3 SIP-based telephony, 2.4 Difference between IP telephony and file sharing, 4.1 Replicate registrations vs search on callsetup.

*Primary Examiner* — Ahmad Matar
*Assistant Examiner* — Kharye Pope
(74) *Attorney, Agent, or Firm* — Buchanan Ingersoll & Rooney PC

(57) ABSTRACT

In one aspect, a call distribution in a direct communication network, also designated as a peer-to-peer network is provided. In doing this, the difficulty exists of integrating the call distributing functionality into the peer-to-peer network while retaining the self-organization capability and the fail-safety of existing peer-to-peer networks. To solve for his, items of characteristic information of a number of clients are transmitted to the client carrying out the call distribution, and this client routes an incoming call on the basis of these items of characteristic information.

18 Claims, 2 Drawing Sheets

(56) References Cited

U.S. PATENT DOCUMENTS

| | | | |
|---|---|---|---|
| 6,826,194 B1* | 11/2004 | Vered et al. | 370/449 |
| 6,879,683 B1* | 4/2005 | Fain et al. | 379/265.02 |
| 6,917,610 B1* | 7/2005 | Kung et al. | 370/352 |
| 6,980,821 B2* | 12/2005 | Balasuriya et al. | 455/518 |
| 7,072,966 B1* | 7/2006 | Benjamin et al. | 709/228 |
| 7,734,909 B1* | 6/2010 | Roush et al. | 713/154 |
| 2001/0012776 A1 | 8/2001 | Chandler et al. | |
| 2002/0024955 A1* | 2/2002 | Suzuki | 370/395.2 |
| 2002/0076031 A1* | 6/2002 | Falcon et al. | 379/265.11 |
| 2002/0114282 A1* | 8/2002 | MeLampy et al. | 370/238 |
| 2002/0114432 A1* | 8/2002 | Shaffer et al. | 379/90.01 |
| 2002/0136206 A1* | 9/2002 | Gallant et al. | 370/352 |
| 2002/0159440 A1* | 10/2002 | Mussman et al. | 370/352 |
| 2003/0007625 A1* | 1/2003 | Pines et al. | 379/223 |
| 2003/0037113 A1* | 2/2003 | Petrovykh | 709/205 |
| 2004/0098274 A1* | 5/2004 | Dezonno et al. | 705/1 |
| 2004/0233898 A1* | 11/2004 | Otsuka et al. | 370/352 |
| 2004/0259541 A1* | 12/2004 | Hicks et al. | 455/426.1 |
| 2005/0074031 A1* | 4/2005 | Sunstrum | 370/493 |
| 2005/0080858 A1* | 4/2005 | Pessach | 709/206 |
| 2005/0086211 A1* | 4/2005 | Mayer | 707/3 |
| 2005/0111653 A1* | 5/2005 | Joyce et al. | 379/265.09 |
| 2005/0201362 A1* | 9/2005 | Klein et al. | 370/352 |
| 2005/0249196 A1* | 11/2005 | Ansari et al. | 370/352 |
| 2005/0286709 A1* | 12/2005 | Horton et al. | 379/265.09 |
| 2006/0062376 A1* | 3/2006 | Pickford | 379/265.12 |
| 2006/0109975 A1* | 5/2006 | Judkins et al. | 379/265.02 |
| 2007/0030843 A1* | 2/2007 | Miller et al. | 370/352 |
| 2010/0208634 A1* | 8/2010 | Eng et al. | 370/310 |

FOREIGN PATENT DOCUMENTS

| | | |
|---|---|---|
| EP | 0421583 A1 | 4/1991 |
| EP | 1 237 347 A | 9/2002 |
| WO | WO 2004/06 66 05 A1 | 8/2004 |

* cited by examiner

CALL DISTRIBUTION IN A DIRECT-COMMUNICATION NETWORK

CROSS REFERENCE TO RELATED APPLICATIONS

This application is the US National Stage of International Application No. PCT/EP2005/054703, filed Sep. 20, 2005 and claims the benefit thereof. The International Application claims the benefits of German application No. 102004055494.3 DE filed Nov. 17, 2004, both of the applications are incorporated by reference herein in their entirety.

FIELD OF INVENTION

The invention relates to a method and to a communication component for a direct-communication communication network.

BACKGROUND OF INVENTION

In communication arrangements, incoming calls which do not reach the correct receiver directly are forwarded to the correct receiver. This is the case particularly when a caller does not know the "correct" contact, for example in a relatively large company. An incoming call of this kind can then be forwarded automatically to a person or his communication terminal. Such technical facilities for automatic distribution of incoming communication links (calls) are often also to a ACD (Automatic Call Distribution) systems and are used for what are known as call centers (Hotlines).

ACD systems comprise either a special supplementary program which is part of a private exchange (communication system, communication node) or else an external appliance (server) which is connected to a communication system and prescribes for the communication system the respective relaying destination (person or his communication terminal) for an incoming call. In this context, the relaying destination is frequently also selected by evaluating information about properties of the incoming call (known as call properties). By way of example, the employees at a call center may have various associated geographical areas; in this case, the associate between the geographical area and an employee is an item of property information. If an incoming call involves the caller's telephone number being transmitted (Clip function), the ACD system can use the dialing code to determine the origin of the call and, through comparison with stored property information, can determine the accordingly associated employee and hence his communication terminal as the call forwarding destination. Alternatively, the ACD system can also accept an incoming call automatically and, through voice-controlled interrogation which the caller answers using DTMF key selection, for example, can categorize it, that is to say ascertain call properties, until the correct contact or a group of correct contacts can be determined.

The document EP 1 237 347 A2 Coussement "Distributed hardware/software system for managing agent status in a communication center" discloses such an ACD system in a circuit-switched communication network. A central facility, known as the "Agent Presence Application", monitors the resources of employees (agents) and transmits state information obtained in the process to further applications in the communication network which are connected thereto.

SUMMARY OF INVENTION

Particularly in the course of the increased use of packet-switched communication networks (VoIP-networks; VoIP=Voice-over-Internet-Protocol), increasing use is being made of direct-communication communication networks. These communication arrangements which are also known as peer-to-peer networks (P2P networks), have the special feature that they operate without a central switching entity (communication system, gatekeeper, or the like). Peer-to-peer networks have primarily become known as what are known as file sharing networks for interchanging files (usually music files or digitized movies) but are also increasingly used for direct voice communication (telephony, video telephony, chat etc). In these peer-to-peer networks, it is not possible to integrate an ACD system into a switching entity (communication system, gatekeeper) because either no central switching entity exists or else an (optionally useable) central entity is not inevitably used for setting up a communication link or forwarding an incoming call. Although it is possible to nominate a communication component—in peer-to-peer networks these are also called "clients"—as a central contact, that is to say as a call destination, for incoming calls and to provide this contact with an ACD function, this conflicts with the peer-to-peer concept because the creation and compulsory use of such a central entity lose the flexibility inherent in peer-to-peer networks and the capability of self-organization. Furthermore, the redundancy inherent in peer-to-peer networks no longer exists because if this central entity fails then the ACD function is no longer present until another entity is administrated as central call destination and an ACD function is set up in it.

It is therefore an object of the present invention to improve the forwarding of incoming calls in direct-communication communication networks and to reduce the administration complexity for direct-communication communication networks.

The object is achieved for the method and for the communication component by the features of the independent claims.

The solution provides a method for forwarding an incoming call on a first client to a second in a plurality of further clients in a direct-communication communication network, in which the second client is selected from the plurality of further clients, the selection is made by the first client, the selection is made using property information which is respectively associated with the further clients and which is available in the first client, and in which the call is forwarded to the selected instances of the further clients. An advantage of this method is that the function of an ACD system is provided by the "equal-authority" components in a direct-communication communication network, with a central entity not being required and hence the existing functionality being maintained even if individual entities or clients (communication components) fail.

The solution also provides a communication component for a direct-communication communication network, having a forwarding function for forwarding an incoming call to one of a plurality of further communication components, where the communication component has memory means for storing its own property information and further property information from the further communication components, is provided with a retrieval device for retrieving the property information from further communication components, comprises a detection device for detecting at least one call property associated with the incoming call, has a selection device for relating the property information to the at least one call property, where the selection device is set up to select those of the communication components whose property information has a match with the call property, and comprises transmission means for transmitting its own property information to the further communication components. A communication component of this kind in a direct-communication communication network may either be a forwarding entity or form the forwarding destination. Such a communication component is able to detect the property information from other communication components and to take it into account for selecting the forwarding destination, and furthermore also provides its own property information for the other communication components in the same communication network. The use of such communication components also allows the function of an ACD system to be mapped in direct-communication communication networks without a central entity.

The inventive method is advantageously refined further by the features of the dependent patent claims. The features and advantages described therein also apply mutatis mutandis to the inventive communication component.

If the further clients respectively provide their associated property information for retrieval, and before the selection by the first client, this property information is retrieved from the further clients, the manual administration of the property information in each client forwarding a call is dispensed with. In this case, the step of "retrieval" can be dispensed with if the further clients automatically transmit their associated property information to the first client. In this context, the property information is always present in a current version in the first client if the property information is repeated under time control and/or, in the event of a change in the property information, is transmitted to the first client.

The network load in the communication network can be reduced by virtue of the property information being transmitted selectively and only when required. In this regard, the property information is advantageously retrieved by sending an interrogation message with at least one search term from the first client to at least one of the further clients.

The communication network also allows the use of clients which do not have their own option for storing and transmitting their own property information. In this regard, advantageously, at least one of the further clients contains the associated property information from a plurality of or all further clients available for retrieval. Another advantage of this practice is that the property information from a plurality of clients can be transmitted collectively, that is to say in a single transmission step Errors when forwarding calls are reduced or even prevented by virtue of the property information having, at least in part, an associated maximum validity period, and such property information whose maximum validity period has expired not being used for selection and/or being retrieved again from the further clients associated with this property information. In this context, the "knowledge" required for selection is distributed over the clients in the communication network, so that central data management of the property information is not required.

The destination for forwarding an incoming call can be determined more precisely by virtue of, for the selection, at least one call property associated with the incoming call being evaluated. In this context, the network load for transmitting property information is reduced further by virtue of the search term being formed, at least in part, from the call property. Simple and at the same time effective selection of the destination client is possible if a telephone number associated with the incoming call is used as associated call property.

When calls are repeatedly received from the same caller or in the same subject area, renewed forwarding to the same destination client is insured by virtue of the forwarding involving the at least one call property associated with the incoming call and information about the selected client (destination client) being stored, and a subsequent further incoming call with at least one identical or similar associated call property involving the use of the stored information to forward this subsequent call to the same selected client.

When an incoming call arrives at any of the available clients, it suffices if a client is used either as a first client or as one of the further clients. This furthermore improves the redundancy, because if a first client fails then one of the further clients can be used as first client.

BRIEF DESCRIPTION OF THE DRAWINGS

Exemplary embodiments of the inventive method are explained below with reference to the drawings and simultaneously serve as an exemplary embodiment of a communication component based on the invention.

In the drawings.

DETAILED DESCRIPTION OF INVENTION

Figure 1:
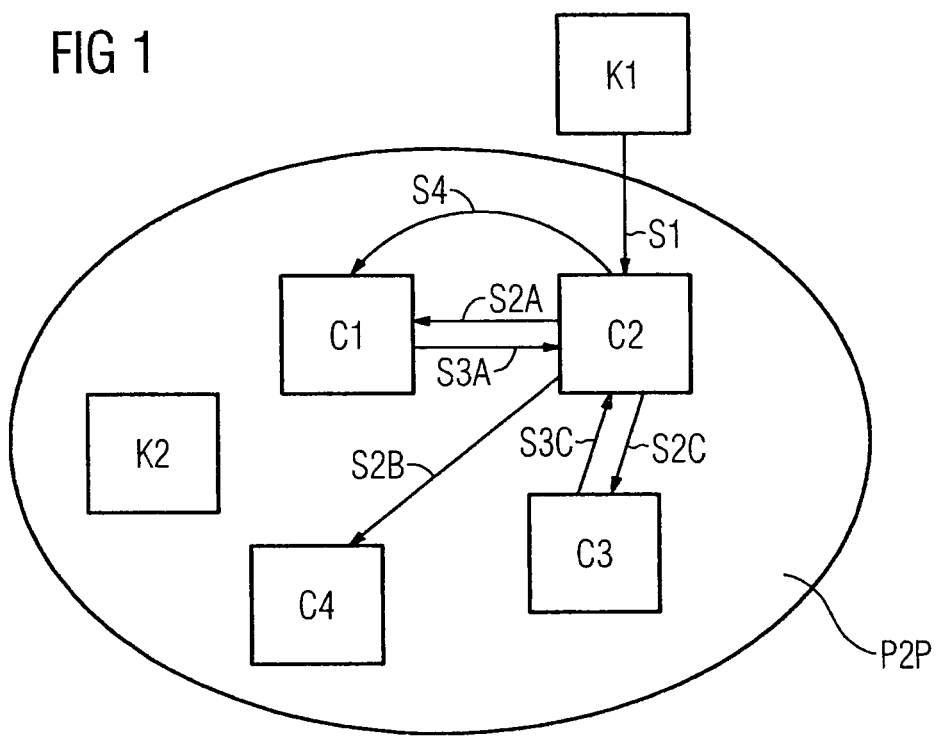
FIG. 1 shows a schematic illustration of a direct-communication communication network with communication components, where arrows are used to show the signaling sent in order to forward an incoming call.

FIG. 1 schematically shows a direct-communication communication network P2P (Peer-to-Peer) which contains the clients C1, C2, C3, C4. The clients C1, C2, C3, C4 are formed by communication components (IP telephone, multimedia PC, PDA, WLAN terminal, smart phone or the like), with client C1 being a communication component with a voice mail server functionality (telephone answering machine function), clients C2 and C3 being multimedia PCs (computer with a telephony function), and client C4 being a IP phone (VoIP telephone). In this arrangement, the clients C2, C3 and C4 are associated with the employees at a call center who are associated with different responsibilities and are intended to handle calls from external customers. A further communication component K2, which is likewise arranged in the communication network P2P is not part of the workgroup. The Communication component K1 is shown in FIG. 1 as a representative of an unlimited number of external communication components and, in this exemplary embodiment, represents the communication terminal of a customer who is calling the hotline formed by the clients C1, C2, C3 and C4. The arrows shown in FIG. 1 symbolize signaling messages S1, S2A, S2B, S2C, S3A, S3B, S3C, S4 which are interchanged between the communication components or the clients formed thereby in order to relay a call.

The text below refers to FIG. 1 to show the forwarding of a call which is sent from the communication component K1 to the client C2 in the direct-communication communication network P2P. To reach the workgroup which form the "hotline", the communication component K1 sends a signaling message S1 to a gateway which connects the communication network P2P to a public communication network (not shown here). In the communication network P2P, this gateway function is performed by the client C2 ("gateway peer"). In this case, the other clients C1, C3 and C4 may also have such gateway functionality and hence likewise receive calls from an external communication network.

The signaling message S1 is evaluated by the client C2, and it is established that the destination communication address, that is to say the dialed telephone number, does not identify a specifically stated client in the communication network P2P, but rather is the "hotline number" of the work group. In addition, the signaling message S1 reveals the "sender's telephone number", that is to say the sender's communication address of the communication terminal K1. This information, which in this case is referred to as call properties, is extracted from the signaling message S1 by a detection device in the client C2, is buffer-stored and is supplied to a selection device in the client C2, which device is intended to select the ultimate call destination, that is to say the intended client, for a forwarding function.

Figure 2:
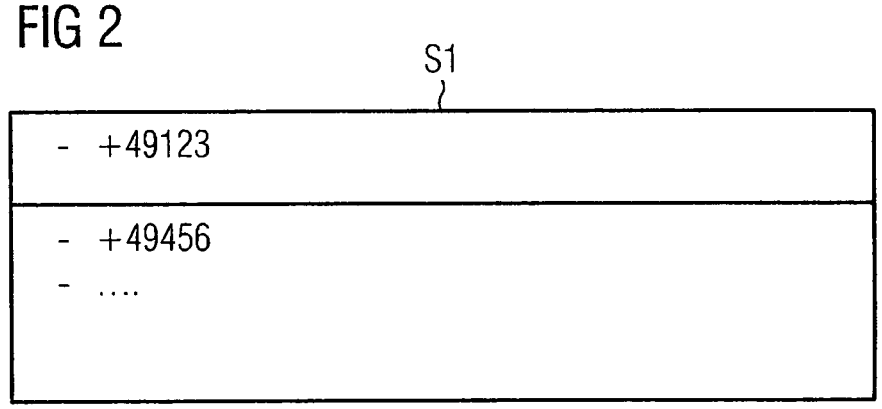
FIG. 2 shows a schematic illustration of the call properties of an incoming call.

The call properties transmitted with the signaling message S1 are shown schematically in FIG. 2. In this case, the telephone number +49123 is indicated in a first data field and the destination telephone number +49456 of the "hotline" is indicated in a further data field. Advantageously, such a signaling message S1 also already stores head words regarding objective contents related to the call. This naturally presupposes that the communication component K1 can also handle (e.g. with an input option) and send such head words. Such objective information regarding contents (known as meta-information) is then also used by the clients C2 or its selection device to select a call destination. Alternatively or in addition, the call may also be initially accepted by the client C2, with the caller requesting appropriate information, for example by means of synthetic voice output in an interactive dialog. Technical facilities for this are often referred to as "interactive voice response" systems in the literature.

In the present exemplary embodiment, it is assumed for the purposes of simplification that just the sender's telephone number +49123 of the communication component K1 is used as a call property to decide about the call destination. In many cases, however, it is more advantageous to decide on the basis of subject areas (capabilities, "skills").

The selection device in the client C2 now uses a progress memory, which stores information about preceding switching processes, to check whether a call with the sender's telephone number +49123 has actually been relayed to one of the clients C2, C3 and C4 in the past (in this case: within the last two weeks). This is not the case; otherwise, the preferred relaying destination (forwarding destination) for this call would be the relevant communication component (client) which has already been selected beforehand.

In a subsequent, step, the selection device checks whether a memory in the client C2 contains property information about one of the clients C2, C3, C4 which correlates to the detected call properties. Since this is not the case either, the client C2 sends interrogation messages S2A, S2B, S2C to the clients C1, C3 and C4. The interrogation messages S2A, S2B, S2C can, as in the present exemplary embodiment, be sent individually to the clients C1, C3 and C4, whose communication addresses are known to the client C2. Alternatively, it is also possible to send a "broadcast message" as an interrogation message, which in this case would reach all clients or communication component in the communication network P2P.

As a search term, the interrogation messages S2A, S2B, S2C comprise the telephone number +49123 of the communication component K1, that is to say a call property of the call which is to be forwarded. The clients C1 and C3 respond to the interrogation message with response messages S3A, S3C, which comprise data records containing property information ("information about oneself"). The response message S3A reveals that the communication component uses the client C1 to provide a voice mail function for calls which cannot or cannot yet be accepted by one of the clients C2, C3, C4. The client C4 which is formed by a simple IP telephone, is not able to generate a response message for the interrogation message S2B. The client C3 responds with the response message S3C, which comprises two data records. The first data record E14 ("property information 4")—not shown here—comprises property information from the client C4. A terminal which is represented by a representative ("proxy") is also referred to as a "virtual peer" in this case.

Figure 3:
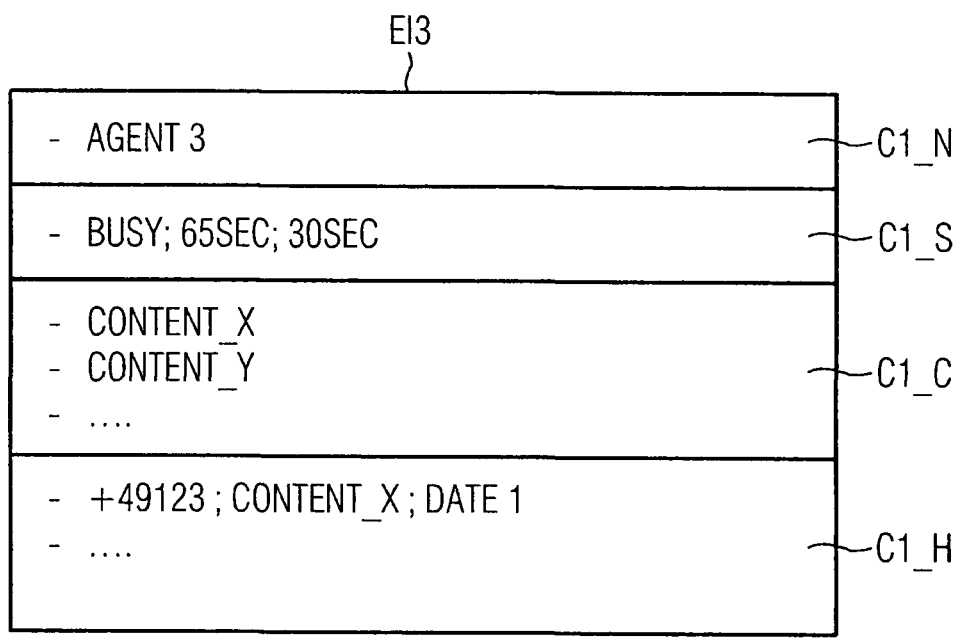
FIG. 3 shows a schematic illustration of the property information from a client (communication component).

A further data record E13, which is shown schematically in FIG. 3, comprises the property information from the client C3. In this case, the data field C1_N stores the name "Agent 3" for the client 3. The data field C1_S records the status "BUSY; 65SEC; 30SEC" (that is to say the client C3 has been busy for 65 seconds; this information has a maximum validity of 10 seconds). Hence, while the status represents comparatively "short-lived" information and therefore has low validity, the rest of the information has a longer or even—as in this example—unlimited "life".

The data field C1_C comprises information about the subject areas CONTENT_X, CONTENT_Y of the case handler who is using the appliance Client C3. Finally, the data field C1_H contains a list of the last "customer contacts" of the client C3, each of these entries having the telephone number (sender's telephone), the subject area and the data/time information for the contact associated with it. The property information from the clients C1, C3, C4 which is received with the response messages S3A, S3C is stored by the client C2 as well as its own property information—client C2 is not only a "Gateway Peer" but also a workstation for an employee with similarly associated property information. In this case, the stored information can also be evaluated for further, future forwarding operations, provided that the maximum validities associated with the property information (elements) have not expired. Equally, the property information obtained in this manner can also be made available to clients.

The property information obtained in this manner is then related to the call properties taken from the signaling message S1 by the selection device. This involves deciding that client C3 is, on the basis of the past contact with the same customer (entry from data field C1_A), the most suitable forwarding destination for the incoming call, but cannot accept the call (yet) on account of its "BUSY" status. Therefore, the call is forwarded to the client C1 (Voice-Mail-Server) by the forwarding function of client C2 using the signaling message S4, the signaling message S4 comprising, for the voice mail server of the clients C1, the instruction to pipe waiting music into the associated call and, after a stipulated waiting time (in this case: 30 seconds; this corresponds to the validity period for the status information in the property information E13), to return the call to the client C2 for a fresh relaying attempt. In this context, meanwhile "expired" property information (in this case: status) is automatically rerequested by the client C2. Alternatively, the client C3 may also be set to report status changes automatically to the client C2, to which property information has already been transmitted with the signaling message S3C, of course. The property information may also contain the information about whether the respective client (at present) is or is intended to be part of the (or of a particular) ACD group (Hotline). This is particularly advantageous when the interrogation message is sent as broadcast message or multicast message. The ACD group can then be formed "spontaneously" without manual administration.

The above configuration can be expanded by any number of clients. Hence, the number of clients with a forwarding function, that is to say gateway peers with an ACD function, for example, is also not limited. In this case, it is fundamental that the resources, that is to say both information (in this case:

the property information) and the switching entities, are not concentrated on or limited to individual components (appliances, clients, server, gateway) but rather are available and can be found "in distributed form" in the network, which allows even load distribution and a high level of failsafety (redundancy). In this context, it is possible, in principle, for any communication component to have both client and server functionalities; these are also therefore referred to as "Servents".

The invention claimed is:

1. A method for forwarding an incoming call from a calling party on a first client to a selected second client of a plurality of second clients in a direct-communication communication network, the method comprising:

receiving the incoming call by the first client, the call comprising first property information, the first property information comprising a first communication address for the calling party and a second communication address at which the second clients are associated for identifying any of the second clients as being sought for connection via the incoming call;

prior to forwarding the incoming call, the first client checking memory in which information about preceding switching processes is stored to check whether a call with the first communication address of the calling party has previously been relayed to one of the second clients within a predetermined amount of time, upon a determination that one of the second clients previously received a call with the calling party within the predetermined amount of time, the first client forwarding the incoming call to that one of the second clients, and upon a determination that none of the second clients previously had a call from the calling party relayed to the second clients within the predetermined amount of time, the first client sending at least one interrogatory message to the second clients;

the second clients receiving the at least one interrogatory message from the first client and responding to the at least one interrogatory message, each of the second clients responding to the at least one interrogatory message by sending a response message to the first client, the response message comprising second property information for the second client and status information for that second client;

the first client receiving the response messages and storing the second property information and status information for the second clients;

the first client relating the second property information from the received response messages to the first property information of the calling party to select the second client to which to forward the incoming call;

the first client selecting one of the second clients for forwarding of the incoming call; and the first client forwarding the incoming call to the selected second client.

2. The method as claimed in claim 1, wherein the second clients respectively provide their associated second property information for retrieval, and prior to the selection by the first client, this property information is retrieved from the second clients.

3. The method as claimed in claim 1, wherein the second clients automatically transmit their associated second property information to the first client.

4. The method as claimed in claim 2, wherein the sending of the second property information of the second clients is repeated under time control.

5. The method as claimed in claim 2, wherein the second property information for the second clients is transmitted to the first client in the event of a change in that second property information.

6. The method as claimed in claim 1, wherein at least one of the second clients contains second property information from another second client of the plurality of the second clients or for all other second clients available for retrieval.

7. The method as claimed in claim 1, wherein the status information has a maximum validity period, and the second property information whose maximum validity period has expired is not used for selection.

8. The method as claimed in claim 1, wherein the status information has a maximum validity period, and such status information whose maximum validity period has expired is retrieved again by the first client from the second clients associated with the expired status information.

9. The method as claimed in claim 1, wherein the first property information of the incoming call is comprised of at least one search term, the at least one search term being different from the second communication address at which the second clients are associated and the first client searches second property information of the second clients received from the response messages based on the at least one search term to select the second client to which the first client forwards the incoming call.

10. The method as claimed in claim 1 wherein the at least one interrogatory message is a broadcast message.

11. The method as claimed in claim 7, wherein the first communication address of the calling party is a telephone number.

12. The method as claimed in claim 1 wherein the first client and the second clients are at least one of IP telephones, PDAs, WLAN terminals, and smart phones.

13. The method as claimed in claim 1, wherein the at least one interrogatory message has at least one search term identified in the first property information of the calling party.

14. A method for forwarding an incoming call from a calling party on a first client to a selected second client of a plurality of second clients in a direct-communication communication network, the method comprising:

receiving the incoming call by the first client, the call comprising first property information comprised of a first communication address for the calling party and a second communication address at which the second clients are associated for identifying any of the second clients as being sought for connection via the incoming call;

the first client sending at least one interrogatory message to the second clients;

the second clients receiving the at least one interrogatory message from the first client;

each of the second clients responding to the at least one interrogatory message by sending a response message to the first client, the response message comprising second property information for the second client and status information for that second client;

the first client receiving the response messages from the second clients and storing the second property information received from the second clients;

the first client relating the second property information from the response messages to the first property information of the calling party to select the second client of the plurality of second clients to which to forward the incoming call;

the first client selecting one of the second clients to which to forward the incoming call; and the first client forwarding the incoming call to the selected second client.

15. The method of claim 14 wherein if one of the second clients previously received a call with the calling party, the first client forwarding the incoming call to that one of the second clients prior to sending the at least one interrogatory message and if none of the second clients previously had a call from the calling party relayed to one of the second clients within a predetermined amount of time, the first client sending the at least one interrogatory message to the second clients.

16. The method of claim 14 wherein the response message from the second clients comprises status information for the second clients, the status information being valid for the first client for a maximum amount of time, the first client using the status information for selecting the selected second client.

17. The method of claim 16 further comprising the first client storing the status information and sending at least one new interrogatory message to the second clients to request property information from the second clients after the maximum amount of time has passed prior to selecting the selected second client.

18. A communications system comprising:
   a first client and a plurality of second clients, the first client having non-transitory memory; and
   the first client receiving an incoming call from a calling party, the call comprising first property information comprised of a first communication address for the calling party and a second communication address at which the second clients are associated for identifying of the second clients as being sought for connection via the incoming call;
   the first client checking memory in which information about preceding switching processes is stored to check whether a call with the first communication address of the calling party has previously been relayed to one of the second clients within a predetermined amount of time,
      upon a determination that one of the second clients previously received a call with the calling party, the first client forwarding the incoming call to that one of the second clients, and
      upon a determination that none of the second clients previously received a call from the calling party relayed to the second clients within the predetermined amount of time, the first client sending at least one interrogatory message to the second clients;
   the second clients receiving the at least one interrogatory message from the first client and responding to the at least one interrogatory message, each of the second clients responding to the at least one interrogatory message by sending a response message to the first client, the response message comprising second property information for the second client and status information for that second client;
   the first client receiving the response messages and storing the second property information and status information for the second clients; and
   the first client relating the second property information from the response messages to the first property information of the calling party to select the second client to which to forward the incoming call.

* * * * *